Feb. 6, 1962 F. T. MOSER 3,019,615
ICE CREAM MIX CONTROL

Filed March 7, 1960 2 Sheets-Sheet 1

INVENTOR
Frank T Moser
by Henry H. Snelling
HIS ATTORNEY

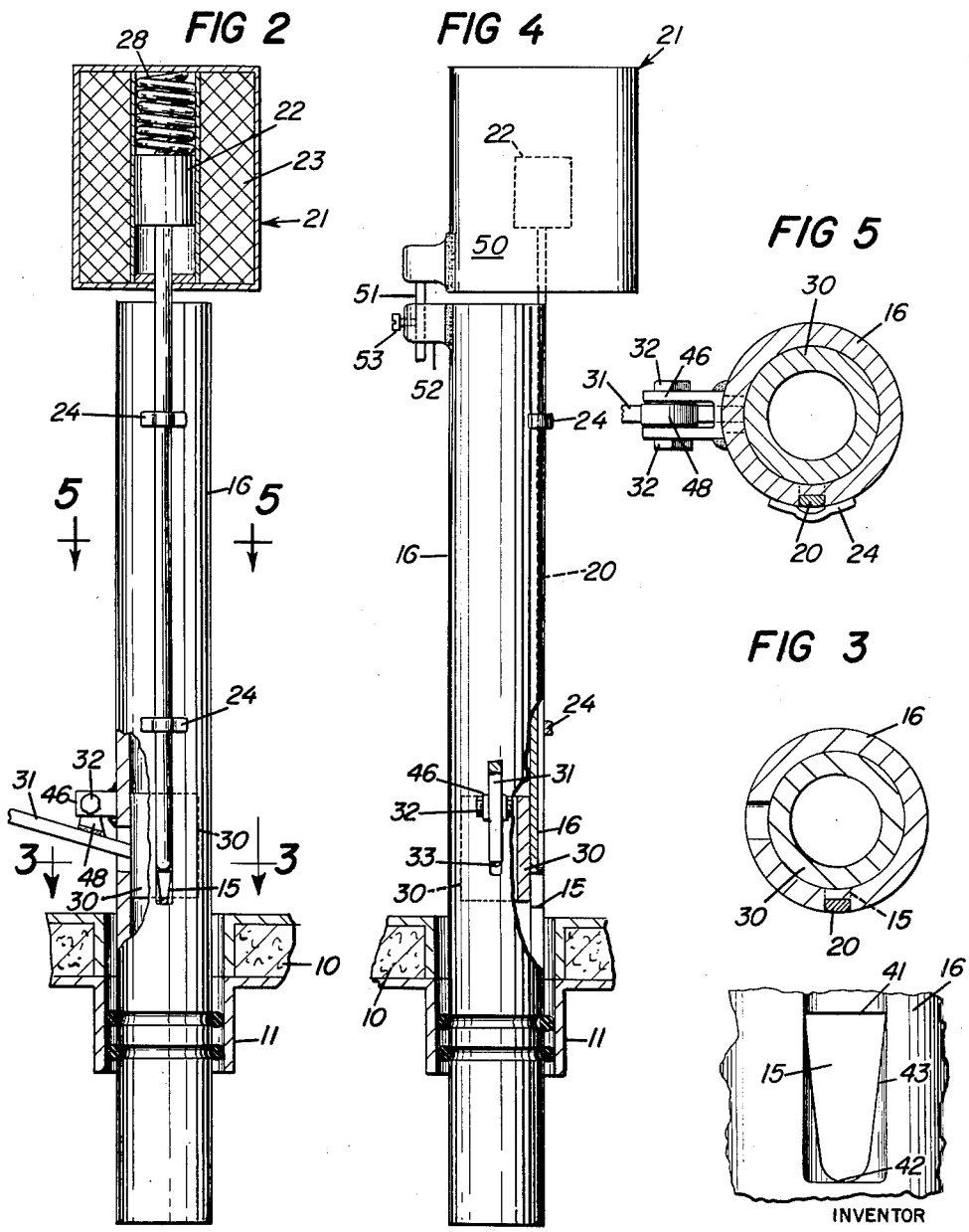

3,019,615
ICE CREAM MIX CONTROL
Frank T. Moser, Easton, Pa., assignor, by mesne assignments, to Mister Softee, Inc., Runnemede, N.J., a corporation of Pennsylvania
Filed Mar. 7, 1960, Ser. No. 13,186
9 Claims. (Cl. 62—132)

This invention relates to the making of ice cream, frozen custard, and the like. It has for its principal object the provision of means to reduce maintenance cost by such control of the quantity of the mix delivered to the freezer as to provide at all times a constant over-run in the product by insuring that the desired proportion of mix is always present within the freezer.

A further object of the invention is to provide means for discharging the mix into the freezer automatically and in such quantity that the load on the dasher is constant. The same quantity of the mix is admitted into the freezer as the amount withdrawn, irrespective of the volume of mix in the reservoir and the consequent change in pressure at the port connecting the reservoir and freezer. This object is accomplished by having the discharge port from the mix reservoir so controlled as to vary its effective opening area in accordance with the quantity of mix stored in the reservoir, a float determining the area of the port that will be uncovered.

A further object of the invention is to provide automatic means for opening and closing the port opening when the main discharge from the freezer is manually operated. A still further object of the invention is to provide an exit port from a mix reservoir so shaped that the amount of mix discharged into the freezer may be varied to agree with the discharge from the freezer without regard to the height of the liquid remaining in the mix reservoir and consequently the pressure existing at the port controlling flow from the reservoir to the freezer.

In the drawings:

FIG. 2 is a view of the main tube partly in section.

FIG. 3 is a horizontal section through the tube taken about the level of the float lever substantially upon the plane indicated by the section line 3—3 of FIGURE 2.

FIG. 4 is a side elevation of the tube.

FIG. 5 is a horizontal sectional view taken substantially upon the plane indicated by the section line 5—5 of FIGURE 2.

Figure 1:
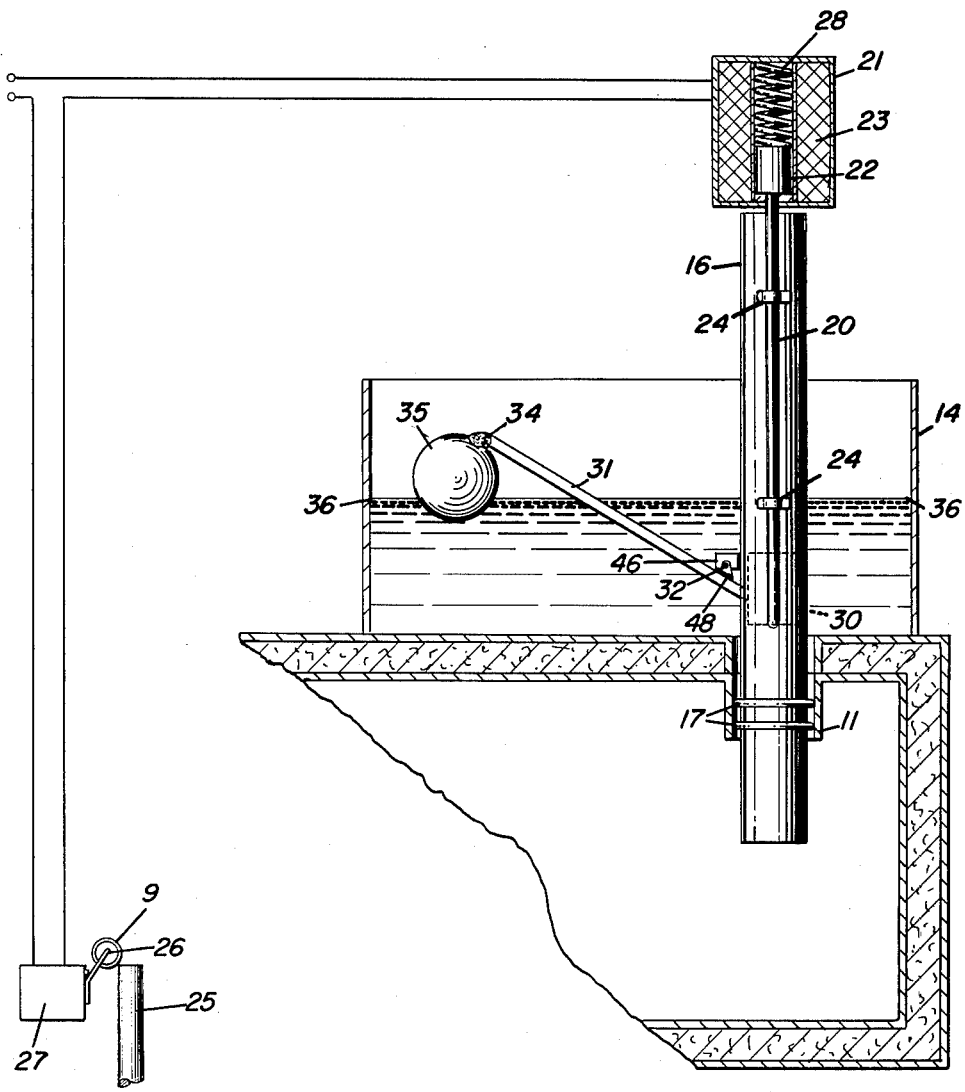
FIG. 1 is a side elevation partly diagrammatic and partly in section.

In the drawings 10 represents a freezer of any conventional style having the usual sleeve 11 extending into the freezer somewhat beyond the end of the dasher (not shown). A conventional mix supply tank or reservoir 14 is mounted on the freezer 10, forming a portion of it. The feed previously has been solely by gravity which is objectionable inasmuch as the operator then has no means of determining the amount of mix that is present in the freezer at any particular time. This is quite harmful for if we put too much mix in the freezer we cause an undue load on the dasher while on the other hand if the amount of mix is too small there is tendency for the dasher to freeze to the inner wall of the freezer. This places a strain upon the dasher with such frequency as to seriously injure the dasher.

In accordance with my invention the mix is fed from reservoir 14 into the freezer 10 through an opening or port 15 in a vertical tube 16, which frictionally engages the sleeve 11. O-rings 17 which may be as few as two in number not only make an excellent seal but also hold the tube 16 rigidly in the exact position desired while permitting ready removal of the tube by rotating it while lifting it. The seals are easily replaced and form a highly efficient joint.

In FIG. 1 the exit port 15 from the mix reservoir 14 is hidden by an elongated slide 20 controlled by a solenoid 21, the armature 22 of which is fairly loose within its coil 23 and carries the slide 20 confined in a vertical channel in the tube 16 by two or more bridges 24 but readily moving up and down to open the port fully on the outside whenever the conventional manually-lifted plug 25 of the freezer is operated to discharge the ice cream or custard into a cone or other receptacle. The movement of this plug 25 engages a roller 26 on a micro switch 27 thus energizing the solenoid 21 and lifting the slide 20 against the downward urge of its light spring 28.

The position of a hollow sleeve valve 30 shown in FIG. 2 (but not in FIG. 1) is governed by a float controlled lever 31 pivoted as at 32, having one end engaging snugly a hole 33 in the hollow valve while the other end 34 is secured to an ordinary float 35. The liquid in the mix reservoir 14 is maintained by frequent manual additions of mix at a level 36 preferably above half-full so that the range of quantity held would normally vary between the liquid level line 36 and the top of the mix reservoir which is open at the top for the stated intermittent manual filling by the operator.

Referring now to FIG. 2 in which the slide 20 is shown in its uppermost position for ease of illustration, this allowing the port to be shown in full lines. The port 15, see FIGURE 4, is of particular shape having a horizontal upper margin 41 and a rounded bottom edge 42 joined by two sloping side edges 43, the configuration of the port being such that when hollow valve 30 is in upper position that is when the liquid in the reservoir is approximately at level 36 the entire port is opened when the slide 20 is in the uncovering position shown, that is when the solenoid is energized by the operator drawing ice cream from the freezer. The effective area of the port 15 is determined by the height of the mix in the reservoir as the greater the quantity of mix the greater the pressure to discharge the mix through the port 15. The float 35 therefore raises and lowers the hollow valve 30 so as to admit at all times the same quantity of mix, but discharging through a greater area of opened port when the mix level is low and through a much smaller area when the reservoir 14 is substantially full and the pressure is therefore greatest. In FIG. 2 the position of the hollow valve 30 as illustrated indicates that the liquid level in the reservoir is between high and low so that the port 15 is more or less restricted.

While the float lever 31 controlling the sleeve valve 30 can be pivoted in any desired manner I use a simple bracket 46, soldered to the tube 16 and carrying a pivot pin 32 on which revolves a lug 48 secured to the lever 31. The hollow sleeve 30 is merely a short length of tubing which like the rest of the device is preferably of stainless steel.

It is important that the solenoid 21 and the long thin slide 20 carried by its armature 22 shall be adjustable with respect to the port 15 and also that these two parts can readily be removed for cleaning without any danger of injury to the solenoid. To this end I add to the conventional bottom portion 50 of the solenoid a short rigid guide 51 passing through a portion 52 added at the top of the tube 16, the guide 51 sliding freely in a slot in the portion 52, and being locked in adjusted position as by a set screw 53. By this means I arrange the parts so that the bottom of the slide 20 just fully closes the port 40. The other parts of the device are readily cleaned by immersion.

The operation is as follows: With the parts as illustrated in FIG. 1 the operator of the freezer manually lifts the plug 25 thereby discharging ice cream from the freezer in the usual manner. This operation causes the top of plug 25 to engage the roller 26 thereby closing the micro switch 27 and completing an electric circuit to energize the solenoid 21. This causes the slide 20 to rise so as to completely free port 15 on the outside but having no effect on the position of the hollow valve 30 within the tube which is governed entirely by the float 35. The mix therefore flows through the open or partly closed port 15 for as long as the operator holds the plug 25 elevated. The rate of flow is always the same as the pressure governs the amount of port area closed. In order to insure that the desired overrun in the frozen product is obtained at all times the effective opening of the port is governed by the float so that the percentage of overrun obtained is at the desired figure which must of course not be greater than the Government limitation of 100 percent. As previously stated this is accomplished by holding the contents of the freezer at a constant chosen level while allowing the liquid level in the reservoir to vary but insuring that the quantity sent from the reservoir shall at all times be the same as the quantity withdrawn from the freezer by the attendant and not be a greater or less amount as it would be if the quantity delivered to the freezer were governed solely by the pressure at a fixed area port. For the best product it is desired that the overrun be kept at about 50 percent, this requiring six pints of mix in a freezer of one gallon content as the mixture expands as it is frozen. As soon as the operator releases the plug 25 the slide 20 is discharged downwardly by the spring 28 which constantly presses against the armature 22 and is of such strength as to accomplish this purpose without offering particular resistance to the raising of the armature when its coil is energized.

What I claim is:

1. In a combination a freezer, a mix reservoir, means for conveying mix from the reservoir to the freezer and having a port therein, means controlled by discharge of frozen confection from the freezer for opening and closing said port and further means for changing the effective area of the port in accordance with changes in depth of the mix in the mix reservoir.

2. The combination with a freezer and a mix reservoir of a tube feeding mix from the reservoir to the freezer and having an entry port within the mix reservoir, a valve to open and close the entry port, a sleeve movable to vary the effective area of the port, and means governed by the depth of mix in the reservoir for controlling the position of the sleeve.

3. The combination of claim 2 in which the valve is a shut-off member controlled by a solenoid and the position of the solenoid with the shut-off member is adjustably mounted on the tube.

4. The combination of claim 4 in which the valve is an elongated member sliding in a groove in the tube and is attached to the armature of the solenoid, whereby the solenoid and the slide valve may be removed as a unit while the tube is being sterilized.

5. The combination of claim 2 in which the means includes a float-controlled lever, one arm of which controls the position of the sleeve.

6. A tube assembly for use with a freezer for serving frozen confection, comprising a tube having a groove on its surface, a port opening through said groove, an elongated slide in said groove, a solenoid mounted on the tube and having an armature connected to and governing the position of said slide to cover and uncover said port, a sleeve slidable within the tube to vary the effective area of opening of said port, and means for altering the position of the sleeve.

7. In combination, an ice cream freezer, a mix reservoir, a tube for connecting the mix reservoir with the freezer, said tube having a port with two of its side margins tapering, a sleeve within the tube movable to close the port to a desired amount and means controlled by the liquid level of the mix for raising and lowering said sleeve.

8. The combination with a freezer, a mix reservoir mounted on the freezer, a tube discharging from the mix reservoir into the freezer, and means governed by the height of the mix in the reservoir for controlling the flow through the tube, of a cylindrical support secured to the freezer, a pair of transverse grooves in said tube and a plurality of O-rings in said grooves whereby the tube can be anchored in adjusted position with respect to the freezer by said O-rings engaging said cylindrical support.

9. The combination in a frezer for discharging a frozen confection in response to a manually controlled exit valve, a mix reservoir mounted on the freezer, a tube mounted on the freezer and passing through the mix reservoir and having a port therein with tapered sides converging toward the bottom of the port, a solenoid-controlled slide valve for opening and closing the port upon operation of the manually cntrolled exit valve, a sleeve within the tube, and a float-controlled lever for raising and lowering the sleeve to vary the effective area of said sleeve in accordance with the height of the mix in the reservoir, said tube with the float mechanism and sleeve being frictionally held in the freezer for vertical adjustment of the tube with respect to the freezer.

References Cited in the file of this patent

UNITED STATES PATENTS

| | | |
|---|---|---|
| Re. 15,163 | Dunlop | July 26, 1921 |
| 914,418 | Hutchins | Mar. 9, 1909 |
| 1,381,442 | Thompson | June 14, 1921 |
| 2,487,408 | Askin | Nov. 8, 1949 |
| 2,635,637 | Karrer | Apr. 21, 1953 |
| 2,737,024 | Swenson | Mar. 6, 1956 |
| 2,740,264 | Thompson | Apr. 3, 1956 |
| 2,767,533 | Lewis | Oct. 23, 1956 |

Disclaimer 3,019,615.—*Frank T. Moser*, Easton, Pa. ICE CREAM MIX CONTROL. Patent dated Feb. 6, 1962. Disclaimer filed Oct. 23, 1964, by the assignee, *Mister Softee, Inc.*

Hereby enters this disclaimer to the entire term of said patent.

[*Official Gazette February 2, 1965.*]